INVENTOR.
JACQUES BOILEAU

United States Patent Office 3,498,354
Patented Mar. 3, 1970

3,498,354
RADIAL TIRE
Jacques Boileau, Clermont-Ferrand, France, assignor to Compagnie General des Etablissements Michelin Raison Sociale Michel & Cie, Clermont-Ferrand, France
Filed Apr. 24, 1968, Ser. No. 723,835
Claims priority, application France, Apr. 27, 1967, 104,523
Int. Cl. B60c *11/06, 11/08*
U.S. Cl. 152—209
8 Claims

ABSTRACT OF THE DISCLOSURE

A pneumatic tire cover has a carcass ply of radial cords, at least one ply rigidifying the crown, and a tread. The tread is formed with circumferential and transverse grooves and, on each side of the median plane of the tire, with circumferential ridges extending substantially continuously around the circumference of the tread. Each circumferential ridge is substantially equidistant from the median plane of the tire and one of the edges of the tread and is bordered on one side by a circumferential groove and on the other side by a circumferential row of transverse grooves. In this way, the circumferential ridges are rendered circumferentially extensible.

BACKGROUND OF THE INVENTION

The present invention relates to tire covers having a carcass ply of radial cords ("radial-carcass tires") and at least one ply rigidifying the crown and, more particularly, to a novel and highly-effective tread for such tire covers.

Tires of the radial-carcass type, and especially radial-carcass tires having a rigid crown reinforcement consisting of example of steel cords, posses outstanding road characteristics due to the great rigidity of the peak in directions parallel to the rolling surface and to the great radial flexibility of the tire sidewalls. The flexibility of the sidewalls results from the fact that the carcass cords lie in planes passing through the tire axis. However, the circumferential rigidity imparted to the tread by the crown reinforcement can sometimes render the tire uncomfortable. A tread stiffened by a crown reinforcement is unable completely to follow and hug the profile of the ground in the direction of the rolling. Further, excessive rigidity can result under certain conditions of use in excessively energetic lateral reactions.

SUMMARY OF THE INVENTION

An object of the present invention is to remedy the disadvantages of great rigidity of a reinforced tire tread while at the same time preserving the advantages of such rigidity. In particular, an object of the invention is to provide a tread with a structure which makes it more flexible in certain respects without weakening it, and which does not result in increased wear and tear or loss of the qualities required for outstanding cornering performance.

The foregoing and other objects of the invention are attained in a representative embodiment thereof by providing a radial-carcass, crown-reinforced tire cover with a novel tread having circumferential and transverse grooves. The tread is characterized in that it comprises circumferential or longitudinal ridges having substantial circumferential continuity only in the middle regions; i.e., regions close to the planes located at equal distances from (a) the median plane of the tire and (b) one of the edges of the tread. The tread is further characterized in that these continuous circumferential ridges are rendered extensible in a circumferential direction by placing them along and on either side of circumferential grooves and in narrowing them locally by means of transverse grooves.

An embodiment of the invention particularly adapted for use in the case of a passenger car tire cover is preferably characterized by the following elements:

(a) In the circumferential or longitudinal direction, five circumferential grooves which are spaced apart at substantially equal intervals are provided. Their design may be undulating or zigzag, the undulations or zigzag preferably being in phase. They comprise a wide center groove, two middle grooves of medium width and, in the zone common to the sidewall and the tread, two narrow marginal grooves.

(b) In the transverse direction, there are provided transverse grooves some of which open into the center longitudinal groove and the others of which open into one or the other of the marginal longitudinal grooves. The transverse grooves are arranged in a staggered pattern. The separation of one from the next in each row is substantially the same as the interval between the longitudinal grooves. These cross or transverse grooves do not extend over the entire width of the circumferential ribs but terminate short of the longitudinal middle grooves. The spacing between the longitudinal middle grooves and the adjacent extremities of the transverse grooves is approximately 5% of the total width of the tread and, more precisely, ranges from 3% to 10% of such width.

(c) The longitudinal and transverse grooves are supplemented by narrow cutouts which are transverse or oblique but which are placed only in that part of the width of the tread that contains or is affected by the transverse grooves.

The tread pattern thus includes substantially continuous circumferential ridges or zones in each circumferential rib, along side and on either side of the middle circumferential grooves. Upstanding blocks between circumferentially adjacent transverse grooves are preferably all connected with one another by these continuous circumferential ridges.

The extensibility of the tread in the circumferential direction is facilitated by this design, particularly the transverse grooves and the ungrooved portions. Moreover, in the transverse direction, the tread is comparatively less deformable, inasmuch as the deformations of the various elements, instead of being additive as in the circumferential direction, are in opposition to one another. The optimum combination of flexibility, resistance to wear and tear, and outstanding performance in turns is obtained if the spacings between the grooves in the transverse and circumferential directions are substantially equal.

BRIEF DESCRIPTION OF THE DRAWING

Additional aspects of the invention may be understood from a consideration of the following detailed description of an exemplary embodiment thereof, in conjunction with the attached drawings, in which.

DESCRIPTION OF THE PREFERRED EMBODIMENT

In these figures, the longitudinal median plane of the tire is designated by the line X—X, and the edges of the tread by the broken lines A and A'.

Figure 1:
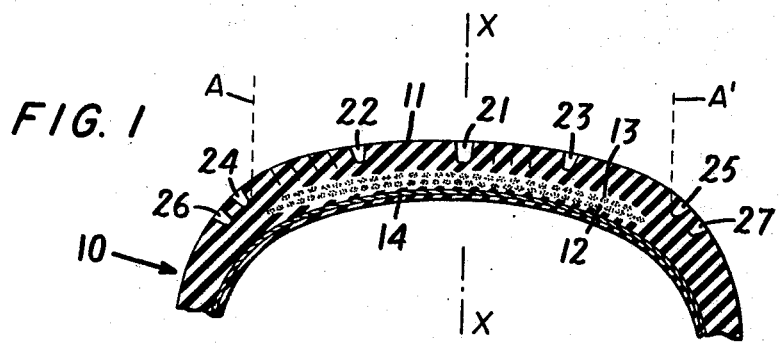
FIGURE 1 is a radial section, in the plane 1—1 of FIGURE 2, of the crown of a tire in accordance with the invention.

FIGURE 1 shows a tire 10 comprising a tread 11 arranged over a crown reinforcement comprising two plies of steel cords 12 and 13. The tire 10 has a carcass comprising a radial-cord ply 14 extending into the tire beads (not shown) which form the edges of the carcass. As may be seen, the tire has a comparatively wide and generally cylindrical profile with rounded shoulders.

Figure 2:
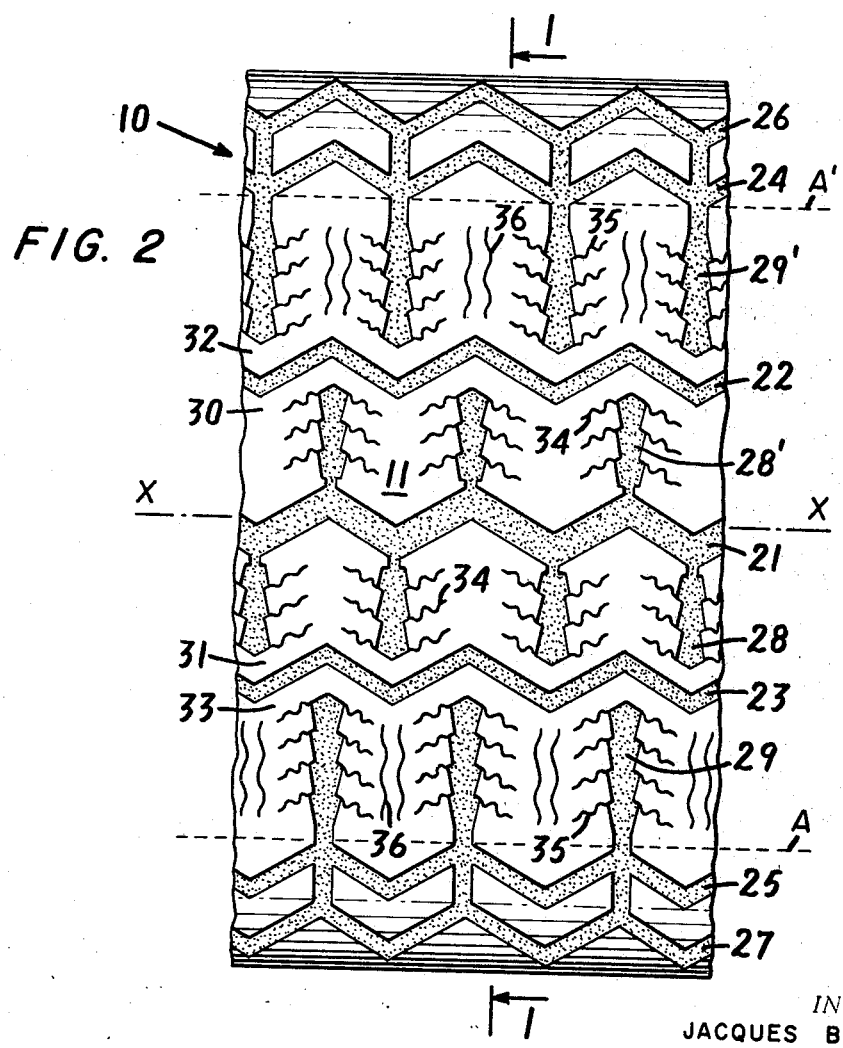
FIGURE 2 is a developed plan view, on a scale larger than that of FIGURE 1, of a portion of the tire tread.

FIGURE 2 shows in detail the design of the tread 11, which comprises a center circumferential groove 21, two middle circumferential grooves 22 and 23 and two marginal circumferential groves 24 and 25. Each of the middle grooves 22 and 23 is substantially equidistant from one of the edges (A' and A, respectively) of the tread 11 and the median plane X—X. The center groove 21 is notably wider than the others. The marginal grooves 24 and 25 are narrower than the center groove 21 and duplicate continuous circumferential grooves 26 and 27.

Transverse groves 28 and 28' alternately intersect opposite sides of the center circumferential grove 21. Likewise, transverse grooves 29 and 29' branch off the marginal grooves 24 and 25, respectively. The combined transverse grooves 28, 28', and 29, 29' are arranged in a staggered pattern. Moreover, these grooves terminate short of the middle circumferential grooves 22 and 23. Concave portions of the grooves 22 and 23 are adjacent to the transverse grooves 28, 28' and 29, 29'.

On either side of the circumferential grooves 22 and 23 are continuous ridges 30, 31, 32 and 33 which run between the rows of transverse grooves. These ridges 30, 31, 32 and 33 join together the upstanding blocks located between the transverse grooves. The continuous ribs 30 to 33 are essentially in the middle part of each transverse half of the tread and extend over a width of approximately 5% and, more precisely, 3% to 10% of the width of the tread. The arrangement of these continuous ribs 30 to 33, each placed between one of the circumferential grooves and one row of transverse groves, facilitates their longitudinal extensibility.

Finally, various narrow cutouts 34, 35, 36 are provided only in that zone of the tread which is affected by the transverse grooves 28, 28' and 29, 29'. Therefore, they do not interrupt the continuity of tre ribs 30 to 33.

Thus, there is provided in accordance with the invention a novel and highly-effective pneumatic tire cover well adapted to provide outstanding riding and cornering performance while showing outstanding resistance to wear and tear. The tire is not more expansive than many conventional tires, which do not offer the same advantages.

Those skilled in the art will appreciate that the invention includes many modifications of the representative embodiments described above consisting, for example, in making the "transverse" grooves oblique, in providing the various circumferential grooves with undulations of different amplitudes, and in forming the transverse grooves with various lengths (for example alternating longer and shorter ones) or widths, provided only that there are preserved in middle regions substantially continuous circumferential ridges or zones which are rendered more extensible by the proximity of adjacent longitudinal and substantially transverse grooves. Accordingly, the invention is to be construed as including all the embodiments thereof within the scope of the appended claims.

I claim:
1. A pneumatic tire cover comprising a carcass ply of radial cords, at least one ply rigidifying the crown, and a tread, said tread being formed with circumferential and transverse grooves, said circumferential grooves being spaced apart at substantially equal intervals and said transverse grooves being arranged in circumferential rows, the transverse grooves in each row being spaced apart at substantially equal intervals, the spacing of said circumferential grooves being substantially equal to the spacing of said transverse grooves in each row, said tread further being formed on each side of the median plane of the tire with circumferential ridges extending substantially continuously around the circumference of the tread, each of said circumferential ridges being substantially equidistant from the medium plane of the tire and one of the edges of the tread, the remainder of said tread being devoid of ridges extending substantially continuously around the circumference of the tread, and each of said circumferential ridges being bordered on one side by one of said circumferential grooves and on the other side by a circumferential row of said transverse grooves, whereby said circumferential ridges are rendered circumferentially extensible.

2. A pneumatic tire cover according to claim 1 wherein said tread is formed with upstanding blocks between said transverse grooves and said circumferential ridges connect said blocks.

3. A pneumatic tire cover according to claim 1 wherein said tread is formed with five of said circumferential grooves.

4. A pneumatic tire cover according to claim 3 wherein said circumferential grooves are undulating and in phase.

5. A pneumatic tire cover according to claim 3 wherein said circumferential grooves include a wide center groove, two middle grooves of medium width, and two narrow marginal grooves.

6. A pneumatic tire cover according to claim 1 wherein the transverse grooves of one circumferential row are staggered with respect to the transverse grooves of an adjacent circumferential row.

7. A pneumatic tire cover according to claim 1 wherein each circumferential ridge has a transverse width ranging from 3% to 10% of the width of the tread.

8. A pneumatic tire cover according to claim 1 further comprising narrow cuts in said tread, said cuts being in each circumferential row of transverse grooves and terminating short of said circumferential ridges.

References Cited

UNITED STATES PATENTS

| 2,120,063 | 6/1938 | Bourdon | 152—209 |
| 2,240,542 | 5/1941 | Bourdon | 152—209 |

ARTHUR L. LA POINT, Primary Examiner

C. B. LYON, Assistant Examiner